United States Patent [19]

Grois et al.

[11] Patent Number: 5,063,672
[45] Date of Patent: Nov. 12, 1991

[54] HAND-HELD TOOL FOR SCORING AND SEVERING AN OPTICAL FIBER

[75] Inventors: Igor Grois; Mark Margolin, both of Lincolnwood, Ill.

[73] Assignee: Molex Incorporated, Lisle, Ill.

[21] Appl. No.: 549,877

[22] Filed: Jul. 9, 1990

[51] Int. Cl.$^5$ .......................... B26B 3/03; B26B 3/06; B26D 7/00
[52] U.S. Cl. ................................... 30/272.1; 30/162; 30/286; 83/167
[58] Field of Search ................ 30/90.1, 162, 167, 280, 30/282, 286, 272.1; 81/914; 83/167

[56] References Cited

U.S. PATENT DOCUMENTS

| | | | |
|---|---|---|---|
| 2,569,080 | 9/1951 | Trimble et al. | 30/162 |
| 3,484,940 | 12/1969 | Zell, Jr. | 30/162 |
| 3,911,577 | 10/1975 | Nickel | 30/280 |
| 4,086,698 | 5/1978 | Sparks | 30/286 |
| 4,582,392 | 4/1986 | Williams et al. | 83/167 |
| 4,683,656 | 8/1987 | Peyrot et al. | 30/162 |
| 4,713,885 | 12/1987 | Keklak et al. | 30/162 |
| 4,842,361 | 6/1989 | Schrauder | 83/167 |
| 4,928,424 | 5/1990 | Campanelli et al. | 30/280 |

Primary Examiner—Douglas D. Watts
Assistant Examiner—Paul M. Heyrana
Attorney, Agent, or Firm—Louis A. Hecht; Stephen Z. Weiss; A. A. Tirva

[57] ABSTRACT

A hand-held tool is provided for scoring and severing an optical fiber. An elongate, generally hollow body has a longitudinal axis extending lengthwise thereof and defines a graspable handle for the tool. A plunger is reciprocally mounted in the hollow body for movement in a path generally in the direction of the longitudinal axis. An optical fiber is supported at one end of the body transverse to the longitudinal axis, and a deflector places the optical fiber under tension. A scoring probe is operatively associated with the plunger and movable therewith towards the fiber for scoring and severing the fiber extending across the path of movement of the scoring probe. An actuator lever is pivotally mounted on the body, operatively associated with the plunger, with a finger depressible portion exposed exteriorly of the body, for manual actuation while grasping the body to move the plunger and scoring probe towards the tensioned optical fiber.

20 Claims, 2 Drawing Sheets

HAND-HELD TOOL FOR SCORING AND SEVERING AN OPTICAL FIBER

FIELD OF THE INVENTION

This invention generally relates to an optical fiber severing device and, more particularly, to a hand-held tool for severing an optical fiber, the tool being extremely simple to manufacture and use.

BACKGROUND OF THE INVENTION

It often is desirable to transmit light energy by means of optical fiber wave guides. Visible light may be transmitted to a remote location by means of a single fiber wave guide. In complicated applications, multiple specific optical signals may be transmitted, such as in a communication system using multiple optical fiber wave guides for signal transmission.

Mirror-smooth surfaces and squared ends are important for minimizing light transmission loss at interfaces or at optical fiber connectors which couple the fibers in end-to-end relationship.

Heretofore, various devices for scoring or inflicting a flaw in a glass fiber required moving a blade with a sharp edge. Such blades or wheels had edges of diamond, silicon carbide, sapphire or like materials which were specifically sharpened to provide the desired mirror-smooth fiber ends. Such blades or wheels require frequent custom resharpening due to wear, which not only is costly but requires constant inspection. Such devices also require such mechanical means as bearings or pivots to move the blade, which means are susceptible to dirt and wear which affects smooth operation of the device and causes accuracy and reliability problems. Such devices also are prone to jam or become misaligned due to jarring or handling.

It then was found that optical fibers easily could be severed to produce square ends with smooth surfaces simply by scoring or scribing the fiber while tension is applied to the fiber during the scoring or scribing step of the operation. However, again, such devices were manufactured in a very complex manner.

For field work, it particularly is desirable to provide an optical fiber severing tool which can be simply manufactured and simply and reliably used to properly severe optical fibers to minimize light loss when the fibers are coupled. An example of a hand-held optical fiber severing tool is shown in U.S. Pat. No. 4,557,049 to Cribbs et al. dated Dec. 10, 1985. Even the device shown in this patent is complicated, requiring plural levers to pivotally move various components in relation to each other, along with pivotal clamping means, as well as cutting means and fiber support means just to score and severe an optical fiber. Such a device, employing a complicated scoring and severing system with a large number of mechanical components further exemplifies the need for a new and improved, simple hand-held tool for scoring and severing optical fibers during field work. This invention is directed to satisfying that need and solving problems such as those described above.

SUMMARY OF THE INVENTION

An object, therefore, of the invention is to provide a new and improved, simple hand-held tool for scoring and severing an optical fiber, particularly during field work.

In the exemplary embodiment of the invention, the tool includes an elongate, generally hollow body having a longitudinal axis extending lengthwise thereof and defining a handle for the tool. Plunger means are mounted in the hollow body for reciprocal movement therewithin in a path generally in the direction of the longitudinal axis. Fiber support means are provided at one end of the body for supporting an optical fiber transverse to the longitudinal axis. Scoring means are mounted on the plunger means and movable therewith towards the fiber support means for scoring and severing an optical fiber extending across the described path. Actuator means are mounted on the body, operatively associated with the plunger means and exposed exteriorly of the body remote from the one end, for manual actuation while grasping the body to move the plunger means and scoring means axially towards the fiber optic support means.

As disclosed herein, the actuator means include a depressible finger portion formed by one end of an actuator lever pivotally mounted to the body on a pivot axis transverse to the longitudinal axis, with the finger depressible portion being exposed exteriorly of the body. Oblique cam means are operatively associated between the actuator lever and the plunger means for converting generally transverse movement of the actuator lever to generally axial movement of the plunger means.

Preferably, the fiber support means include means for applying a tensile force along an axial direction of the fiber. The tensile applying means is in the form of a deflector offset from the axis of the optical fiber in a direction away from the plunger means and scoring means and against which a free end of the fiber is engageable to establish a concave bend in the fiber facing the scoring means.

Other features of the invention include means for adjusting the position of the deflector to vary the extent of the bend in the fiber, adjustable stop means for locating the position of the fiber transversely of the longitudinal axis, and adjustable stop means for limiting movement of the plunger means and scoring means toward the fiber support means. In addition, spring means are provided for biasing the plunger means away from the fiber support means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DETAILED DESCRIPTION OF THE PREFERRED EMBODIMENT

Figure 1:
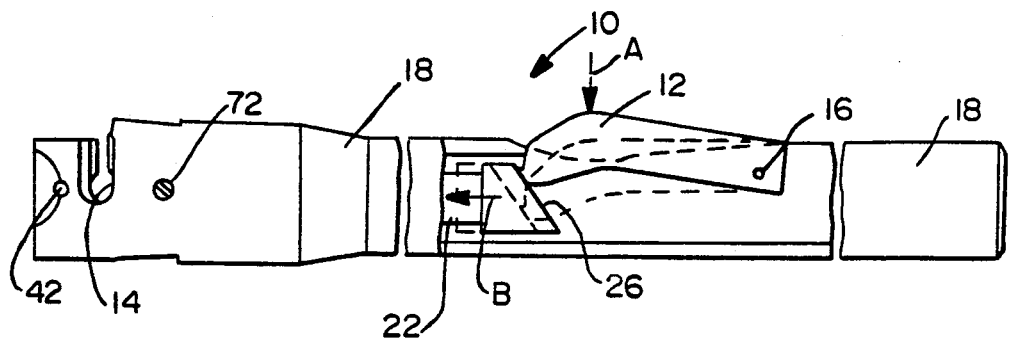
FIG. 1 is a fragmented side elevational view of a hand-held tool for scoring and severing an optical fiber, incorporating the concepts of this invention.

Referring to the drawings in greater detail and first to FIG. 1, a hand-held tool, generally designated 10, is designed for grasping by a user's hand while the user depresses an actuator lever 12, as by the user's thumb, to score and severe an optical fiber which is positioned through a forward opening or access area 14 of the tool. Actuator lever 12 is pivoted, as by a pivot pin 16, inside an elongate, generally hollow housing 18 defining a longitudinal axis extending lengthwise thereof, i.e., right-to-left in the drawings. In essence, body 18 forms a tubular housing for most of the operative components of the tool, with the top of actuator lever 12 exposed exteriorly of the housing as shown in FIG. 1, for depressing by a user's thumb or finger to the position shown in phantom which effects the scoring and severing of the optical fiber. By designing the overall tool in such an elongate or tubular fashion, it is extremely easy to grasp and use during field work.

Figure 2:
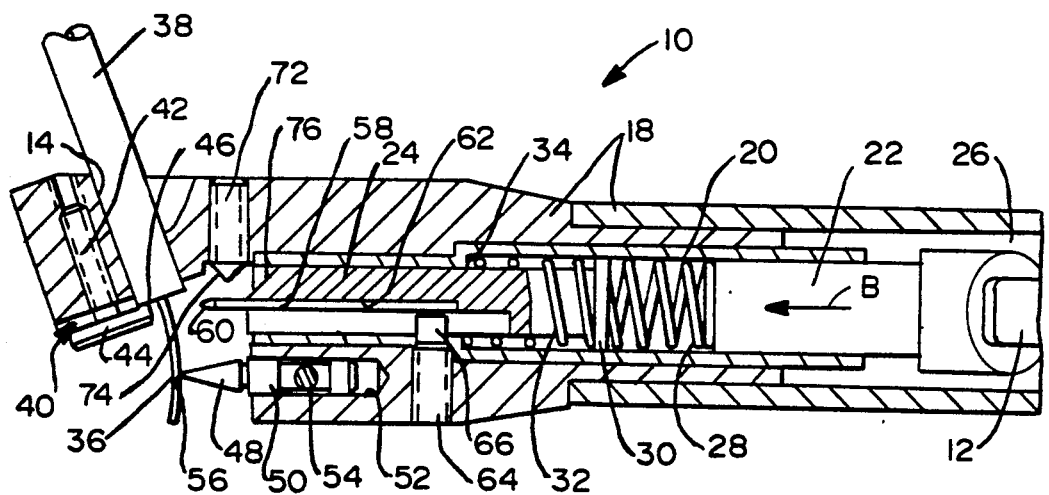
FIG. 2 is a fragmented, axial or longitudinal section, on an enlarged scale, of the tool shown in FIG. 1, rotated 90° from the depiction of FIG. 1, and illustrating the plunger means and scoring means in an inoperative or retracted position.

Referring to FIG. 2 in conjunction with FIG. 1, elongate body 18 actually is fabricated in two parts, as shown, simply for manufacturing and assembly purposes. The body may be fabricated of plastic material, for instance. A cylinder liner 20 is disposed within body 20 and may be of a more durable material for slidably receiving a plunger 22 at an inner end and a slide member 24 at a forward end. Plunger 22 has an oblique cam surface 26 engageable by the free end of actuator lever 12, the cam surface being at an angle or oblique to the longitudinal axis of the body. Consequently, when a user depresses actuator lever 12 inwardly in the direction of arrow "A" (FIG. 1), this transverse movement is converted to longitudinal movement of plunger 22 in the direction of arrow "B" (FIGS. 1 and 2) to move the plunger forwardly toward fiber receiving opening 14.

Spring means are located between plunger 22 and slider 24 for biasing those components away from the fiber receiving end of the tool opposite the direction of arrow "B". Specifically, a first spring 28 is sandwiched between the forward end of plunger 22 and a head portion 30 at the rear end of slider 24. A second spring 32 surrounds the inner end of slider 24 and is sandwiched between the head portion 30 thereof and a shoulder 34 formed on the inside of cylinder liner 20. First spring 28 is a stronger spring than second spring 32 and defines the force of scoring to severe an optical fiber. Second spring 32 is provided to automatically retract slider 24 and plunger 22 rearwardly, opposite arrow "B", when actuator lever 12 is released.

Generally, fiber support means are provided at the front end of body 18 for supporting an optical fiber in a direction generally transverse to the longitudinal axis of the body. Actually, as shown in FIG. 2, an optical fiber 36 has been stripped of its cladding 38, and it is the cladding which is positioned within opening 14 at the front end of the tool. This is understandable when considering the very fragile nature of an optical fiber. Cladding 38 easily can be grasped and manipulated by a user to insert the optical fiber through opening 14 to project beyond the inner end of the opening.

Stop means in the form of a headed bolt-like member, generally designated 40, is provided for locating the position of the optical fiber transversely of the longitudinal axis of the body. More particularly, member 40 is threaded into body 18, as at 42, and has an enlarged head portion 44. The head portion defines a stop shoulder 46 against which the distal end of cladding 38 can abut. With member 40 being threaded into the body, the transverse position of head 44 can be adjusted to thereby adjust the position of the optical fiber.

The fiber support means also include means for placing the optical fiber under tension, i.e., applying a tensile force along an axial direction of the optical fiber. More particularly, a deflector 48 is provided on the end of a rod 50 located in a bore 52 in body 18. A set screw 54 is threaded through body 18 for allowing adjustment and then fixing the position of deflector 48 in a direction generally parallel to the longitudinal axis of the tool, i.e., transverse to the axis of fiber 36. Although deflector 48 is shown pointed in FIGS. 2 and 3, it should be understood that the deflector actually is widened in a direction perpendicular to the drawings to define a wide edge which easily can engage fiber 36. As a user inserts fiber 36 (by means of cladding 38) into opening 14 in body 18, the user simply uses one of his fingers to lightly deflect fiber 36 so that the fiber moves beyond tip 56 of deflector 48. The deflector should be adjustably located to effect a bend in fiber 36 which is concave in a direction facing inwardly of the tool. The amount of the bend determines the tension placed in the fiber, and the amount of tension can be varied by the position of deflector 48 which is adjustable by set screw 54.

Figure 3:
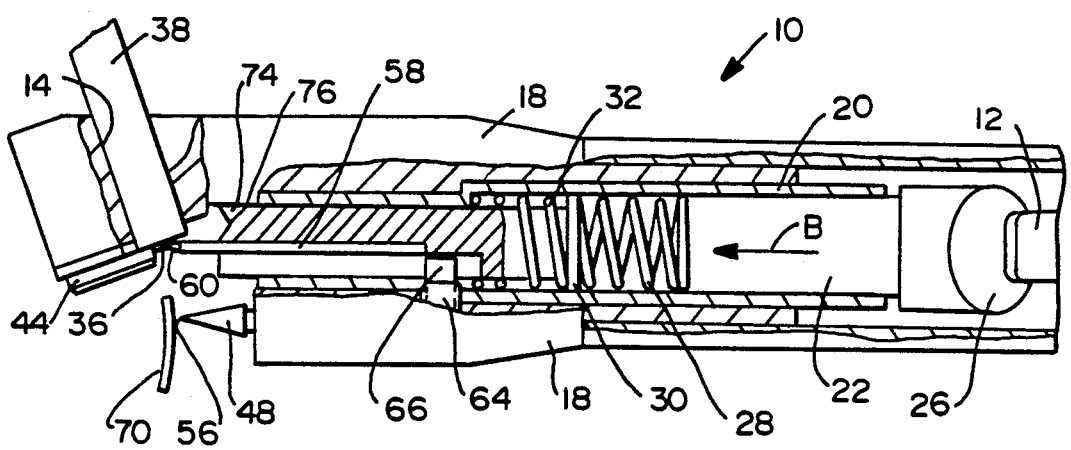
FIG. 3 is a view similar to that of FIG. 2, with the plunger means and scoring means advanced to severe an optical fiber.

Scoring means in the form of a scoring probe 58, having a diamond scoring head 60, is secured to slider 24 for movement therewith in the direction of arrow "B" to engage, score and thereby severe tensioned optical fiber 36, as shown in FIG. 3. As with deflector 48, although scoring probe 58 and diamond head 60 are shown in the drawings to be somewhat narrow, the scoring probe and diamond head actually are widened in a direction perpendicular to the drawings to provide a diamond edge sufficiently wide to ensure engagement with fiber 36. The scoring probe is secured to slider 24 by a press fit into a groove 62 on the underside of the slider as viewed in the drawings. A set screw 64 is threaded into body 18 and has a flat head 66 which underlies widened scoring probe 58 to ensure that the probe does not twist should it loosen for some reason.

In operation, a user grasps the tool by its tubular body 18 comfortably in one hand of the user. The user's other hand is used to grasp the optical fiber by its cladding 38 and to insert the optical fiber into opening 14 while lightly deflecting fiber 36 to pass by the tip 56 of deflector 48 in order to effect a bend in the fiber. Shoulder 46 on head 44 of stop member 40 provides a limit position which the user can feel as cladding 38 abuts the shoulder. The user then depresses actuator lever 12, as by his thumb, to force plunger 22, slider 24 and scoring probe 58 forwardly in the direction of arrow "B", whereby diamond head 60 of the scoring probe scores the fiber at a position shown in FIG. 3, and whereupon the tension in the fiber itself effects the severing of a distal end portion 70 (FIG. 3) of the fiber.

It is important that a large force not be applied to the fiber. With the fiber under tension, a small score or flow will effect its severing and provide a square and mirror-smooth surface at the severed point. To this end, a set screw 72 (FIG. 2) is threaded through body 18. The set screw has an angled inner end 74 which intersects the longitudinal movement of slider 24 and engages an angled surface 76 at the forward end of the slider. It can be understood that the transverse position of end 74 of set screw 72 provides a limit stop and determines the extent of travel of slider 24 and scoring probe 58. Therefore, adjustment in the stroke of the scoring probe can be effected to ensure that excessive force is not applied by diamond head 60 against the fiber.

From the foregoing, it can be seen that a very simple, easily hand-held and manipulatable tool has been provided by this invention. Yet, the simple tool has a full range of adjustments, including means for adjusting the axial position or extent of insertion of the optical fiber in the tool, means for adjusting the bend and, thereby, the tensile force in the fiber itself, and means for adjusting the scoring force on the fiber by adjusting the stroke of the scoring probe. All of the levers and extraordinary numbers of parts of these types of tools heretofore available have been eliminated.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A hand-held tool for scoring and severing a portion of a free end of an optical fiber, comprising:
   an elongate, generally hollow body having a longitudinal axis extending lengthwise thereof and defining a graspable handle for the tool;
   plunger means in the hollow body for reciprocal movement therewithin in a path generally in the direction of said longitudinal axis;
   fiber support means at one end of the body for supporting the free end an optical fiber transverse to said longitudinal axis;
   said fiber support means includes means for placing the free end of the optical fiber in tension;
   scoring means operatively associated with the plunger means and movable therewith towards said fiber support means for scoring the optical fiber extending across said path whereby tensile force applied to the fiber severs the fiber; and
   actuator means on the body, operatively associated with the plunger means and exposed, at least in part, exteriorly of the body remote from said one end for manual actuation while grasping the body to move the plunger means and scoring means axially towards the fiber support means.

2. The hand-held tool of claim 1 wherein said actuator means include a finger depressible portion exposed exteriorly of the body and movable generally transverse to said longitudinal axis.

3. The hand-held tool of claim 2 wherein said finger depressible portion comprises an end of an actuator lever pivotally mounted to the body on a pivot axis transverse to said longitudinal axis.

4. The hand-held tool of claim 3, including oblique cam means operatively associated between the actuator lever and the plunger means for converting generally transverse movement of the actuator lever to generally axial movement of the plunger means.

5. The hand-held tool of claim 1 wherein said actuator means is movable generally transverse to said longitudinal axis, and including cam means operatively associated between the actuator means and the plunger means for converting generally transverse movement of the actuator means to generally axial movement of the plunger means.

6. The hand-held tool of claim 1 wherein said fiber support means include means for applying a tensile force along an axial direction of the optical fiber.

7. The hand-held tool of claim 6 wherein said tensile applying means comprise deflector means offset from the axis of the optical fiber in a direction away from the plunger means and scoring means and against which a free end of the fiber is engageable to establish a concave bend in the fiber facing the scoring means.

8. The hand-held tool of claim 7, including means for adjusting the position of the deflector means to vary the extent of the bend in the fiber.

9. The hand-held tool of claim 1 wherein said fiber support means include stop means for locating the position of the fiber transversely of said longitudinal axis and further including means for adjusting the transverse position of said stop means.

10. The hand-held tool of claim 1, including spring means for biasing the plunger means away from the fiber support means said spring means comprising two counteracting springs.

11. The hand-held tool of claim 1, including stop means for limiting movement of the plunger means and scoring means towards the fiber support means.

12. The hand-held tool of claim 11, including means for adjusting the position of said stop means for varying the stroke of the plunger means and scoring means.

13. The hand-held tool of claim 1 wherein the optical fiber is a glass fiber.

14. A hand-held tool for scoring and severing a portion of a free end of an optical fiber, comprising:
    an elongate, generally hollow body having a longitudinal axis extending lengthwise thereof and defining a graspable handle for the tool;
    plunger means in the hollow body for reciprocal movement therewithin in a path generally in the direction of said longitudinal axis;
    fiber support means at one end of the body for supporting the optical fiber transverse to said longitudinal axis, including means for applying a tensile force to the free end of the fiber along an axial direction of the optical fiber, and first stop means for locating the position of the fiber transversely of said longitudinal axis;
    scoring means operatively associated with the plunger means and movable therewith towards said fiber support means for scoring and severing an optical fiber extending across said path;
    second stop means for limiting movement of the plunger means and scoring means towards the fiber support means;
    actuator means, including a finger depressible portion exposed exteriorly of the body and movable generally transverse to said longitudinal axis, operatively associated with the plunger means remote from said one end, for manual actuation while grasping the body to move the plunger means and scoring means axially towards the fiber support means; and
    spring means for biasing the plunger means away from the fiber support means.

15. The hand-held tool of claim 14 wherein said finger depressible portion comprises an end of an actuator lever pivotally mounted to the body on a pivot axis transverse to said longitudinal axis, and oblique cam means operatively associated between the actuator lever and the plunger means for converting generally transverse movement of the actuator lever to generally axial movement of the plunger means.

16. The hand-held tool of claim 14 wherein said tensile applying means comprise deflector means offset from the axis of the optical fiber in a direction away from the plunger means and scoring means and against which a free end of the fiber is engageable to establish a concave bend in the fiber facing the scoring means.

17. The hand-held tool of claim 16, including means for adjusting the position of the deflector means to vary the extent of the bend in the fiber.

18. The hand-held tool of claim 14, including means for adjusting the transverse position of said first stop means.

19. The hand-held tool of claim 14, including means for adjusting the position of said second stop means for varying the stroke of the plunger means and scoring means.

20. The hand-held tool of claim 14 wherein the optical fiber is a glass fiber.

* * * * *